United States Patent
Alexander et al.

(10) Patent No.: US 7,743,014 B1
(45) Date of Patent: Jun. 22, 2010

(54) FORMING A COMPILATION

(75) Inventors: James Alexander, Mount Kisco, NY (US); Karen A. Melchior, Los Altos, CA (US); Rick S. Seeler, Scotts Valley, CA (US); Shafath Syed, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 622 days.

(21) Appl. No.: 11/100,951

(22) Filed: Apr. 6, 2005

(51) Int. Cl.
    *G06F 17/30* (2006.01)
(52) U.S. Cl. .......... 707/101; 707/5; 707/104.1; 707/3
(58) Field of Classification Search .......... 7/1, 7/100
    See application file for complete search history.

(56) References Cited

U.S. PATENT DOCUMENTS

| | | | |
|---|---|---|---|
| 6,115,717 A * | 9/2000 | Mehrotra et al. | 707/102 |
| 6,654,749 B1 * | 11/2003 | Nashed | 707/10 |
| 7,181,438 B1 * | 2/2007 | Szabo | 707/2 |
| 2002/0165859 A1 * | 11/2002 | Iyengar et al. | 707/5 |
| 2003/0163784 A1 * | 8/2003 | Daniel et al. | 715/514 |
| 2003/0236832 A1 * | 12/2003 | McIntyre et al. | 709/204 |
| 2006/0203261 A1 * | 9/2006 | Kacker | 358/1.6 |

* cited by examiner

*Primary Examiner*—Cam Y T Truong
(74) *Attorney, Agent, or Firm*—Berkeley Law & Technology Group, LLP

(57) ABSTRACT

One of several methods comprises selecting one or more parameters based, at least in part, on a ranking of a relative desirability of said one or more specified parameters and selecting a subset of a set of electronic content for use in at least a portion of an electroniccompilation, wherein said subset may be selected based, at least in part, on said one or more parameters.

22 Claims, 3 Drawing Sheets

FORMING A COMPILATION

BACKGROUND

An electronic compilation may be comprised of one or more types of electronic content. Electronic content may comprise a portion of a compilation, and may include digital images, audio, video, graphics or text, for example. The electronic content may have particular properties, such as a particular quality or size. The electronic content may additionally be limited to a particular use, such as non-commercial use, for example. When forming a compilation, electronic content may be selected and arranged such as to produce an electronic compilation having particular properties, such as desired quality or appearance, and may additionally be selected based on suitability for a particular use, such as commercial use. For example, a digital image may be selected for use in an electronic compilation. The digital image may have properties such as a particular size, resolution or configuration, and these properties may be selected to produce an electronic compilation with a particular appearance. The digital image may additionally be selected to produce a compilation suitable for a particular use. However, selection of electronic content such as digital images that may have properties that make the content suitable for incorporation in an electronic compilation may be time consuming, and a need may exist for a method of selecting content for an electronic compilation.

DESCRIPTION OF THE DRAWING FIGURES

The subject matter regarded as the claimed subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Figure 1:
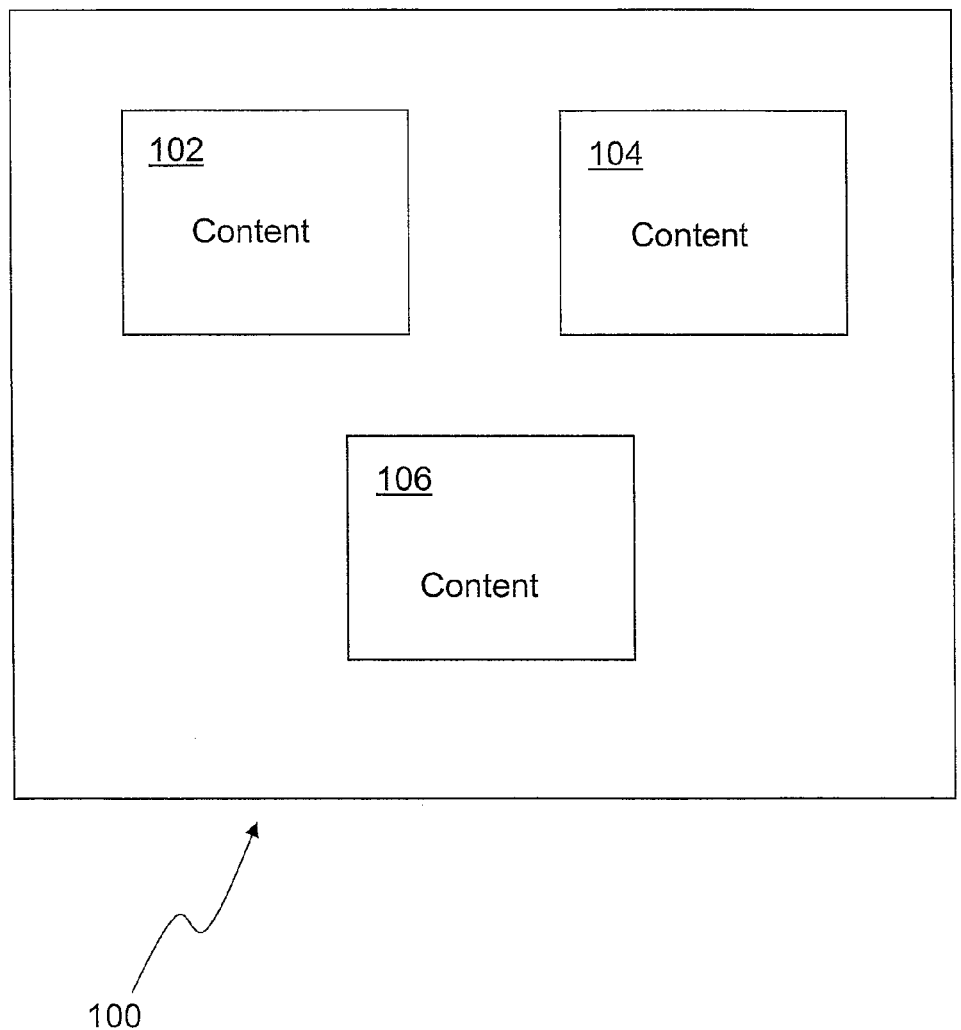
FIG. 1 is a schematic diagram of a compilation, in accordance with one or more embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail.

Some portions of the detailed description that follows are presented in terms of algorithms, programs or the like and/or symbolic representations of operations on data bits or binary digital signals within a computer memory. These algorithmic descriptions and representations may be the techniques used in the data processing arts to convey the arrangement of a computer system or other information handling system to operate according to the programs.

An algorithm may be generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, generating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

Embodiments may include apparatuses for performing the operations herein. This apparatus may be specially constructed for the desired purposes, or it may comprise a general purpose computing device selectively activated or configured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, or any other type of storage medium suitable for storing electronic instructions, and capable of being coupled to a system bus for a computing device or other information handling system.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will be apparent from the description below. In addition, embodiments are not described with reference to any particular programming language. It will be appreciated that a variety of programming languages may be used to implement the teachings of the claimed subject matter as described herein.

In the following description and claims, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a publicly available or commonly utilized standard is discussed, any one or more promulgated versions of the standard may be suitable for any one or more embodiments, and may include prior versions, current versions, and/or future adopted versions.

Referring now to FIG. 1, there is illustrated a schematic diagram of a compilation 100, in accordance with at least one embodiment. Compilation 100 may comprise an electronic compilation displayed on a display device, or may comprise a print compilation, for example. A compilation, in this context, may comprise a collection of one or more preexisting materials, such as a set of one or more pieces of content that may be assembled by selecting, coordinating and/or arranging the content in a particular manner, for example. As shown in FIG. 1, a compilation 100 may include content 102, 104 and 106. Content 102, 104 and 106 may comprise electronic content, for example. Electronic content may include pieces of digital media, and may additionally be referred to as media objects, in at least one embodiment. The content may include one or more digital images, for example, although the claimed subject matter is not limited to any particular type or quantity of content. For example, content may include video, audio, images, illustrations, test, tables, graphics or the like. Content such as described herein may be obtained from one or more providers of content, such as Getty Images, Inc., of Seattle, Wash., USA or Corbis of Seattle, Wash., USA, for example, although in alternative embodiments, the content may be obtained by a designer, obtained elsewhere and/or comprise content in the public domain, for example. The content may have associated limitations on use if it is obtained from a provider, such as one of the providers described above. The provider may provide content having particular limitations on use, such as limitations on commercial use, for example. However, content having limitations on use will be explained in more detail later.

As previously described, compilation 100 may be embodied in one or more forms, such as electronically or in print form. For example, compilation 100 may be embodied as a web page, a print brochure, or in one or more other well-known or to be later developed forms. In at least one embodiment, compilation 100 may be embodied in print or electronic form as an Adobe® Portable Document Format (pdf) file or print document, as specified by Adobe Systems Incorporated of San Jose, Calif., USA. The compilation 100 may be created by use of a content creation or editing program interface such as Adobe® Premiere® Pro 1.5, Creative Suite® version 3, Adobe® InDesign® CS, Adobe® Photoshop® CS or the like, available from Adobe Systems Incorporated of San Jose, Calif., USA. However, these are just a few examples, and it is worthwhile to note that the claimed subject matter is not limited in this respect, and may be created by use of other content creation and/or editing software in whole or in part.

Compilation 100 may comprise a proposed design that may be created in electronic form. Compilation 100 may include one or more 'candidate' pieces of content, such as one or more 'candidate' digital images, portions of digital video, or portions of digital audio. However, in at least one embodiment, 102, 104 and 106 may comprise digital images, for example. Content 102, 104 and 106 may have limitations on use. For example, the content may comprise 'preview-only' or 'comp' (complimentary) content. 'Preview-only' or 'comp' content, in this context, may comprise content that may be used by a person or entity other than the owner of the content for a limited time and/or for a limited use, such as non-public use, and may include production and/or presentation of a proposed media design. The media design may be utilized for preview purposes, which may comprise non-public display of the content, for example. The content may be utilized as 'placeholder' content until a compilation is approved for final publication and/or commercial use, as just an example, and the 'placeholder' content may be replaced at some time after approval, for example. 'Comp' or 'preview-only' content may have differing properties than content that may not be 'comp' or 'preview-only'. For example, if the content comprises a digital image, the digital image may have a lower resolution, lower print quality and/or a particular size that may not be sufficient for use in a compilation that is to be embodied in print form, for example. Additionally, if the content comprises digital audio or digital video, the 'comp' version may have a lower frame rate or lower sampling, rate, respectively, or may be shorter in length, as just an example.

Compilations, such as compilation 100, may have one or more properties. The properties may be based at least in part on the media wherein the compilation may be embodied, such as print or electronic media. The properties of the compilation may include, for example, resolution, media type, format of the compilation, size, quality and/or print properties, for example. Additionally, the compilation may comprise one or more pieces of content that may themselves have particular properties. These properties may depend at least in part on the particular type of media, but may include, for example, resolution, image size, frame size, configuration, quality, file type, cost, gray levels, print characteristics, compression, sampling rate, frame rate, clip length, percentage cropped, limitations on use, and/or classification, for example. Likewise, for both compilations and content for a compilation, the number and type of properties may vary based on the particular type of content, for example.

During the process of creating a compilation, such as compilation 100, for example, content having differing and/or lower quality properties, for example, may be incorporated into the compilation 100. This content may be utilized as 'placeholder' content, as described previously. The compilation may be evaluated, and after approval, the content may be altered or substituted with content having differing and/or higher quality properties, such as a higher resolution, a larger size, and/or suitability for a particular use, such as a commercial use, for example. As described previously, a compilation may comprise one or more 'candidate' pieces of content, which may be 'preview-only' or 'comp' content. The content may be included in the compilation for evaluation, preview or 'placeholder' purposes, and may be replaced with non-'preview-only' or 'comp' content. However, identification of 'preview-only' or 'comp' content in a compilation may involve manually tracking the pieces of content, searching a compilation and identifying one or more properties of the pieces of content included as part of the compilation. This may involve referencing records of the content, for example, in order to determine if the content is 'preview-only' or 'comp' content. In one embodiment of the claims subject matter, a compilation may be created, and one or more pieces of content included in the compilation may be identified as being 'preview-only' or 'comp', such as without the need for manually searching for and identifying the content, for example. The identification of 'preview-only' or 'comp' content may result in a notification that the content may be suitable for replacement, for example. This may allow a designer to replace one or more of the identified 'preview-only' or 'comp' pieces of content, without the need to track and/or identify each piece of 'candidate' content in a compilation as being 'preview-only' or 'comp' or non-'preview-only' or 'comp', for example.

The 'candidate' content may comprise digital images, although, as stated previously, the claimed subject matter is not so limited. The digital images may comprise 'preview-only' or 'comp' images. When a compilation is approved and/or is being produced for final publication, for example, the 'preview-only' or 'comp' images may be altered, or replaced with digital images that are non-'preview-only' or 'comp'. These digital images may have differing higher quality properties, such as a higher resolution and/or a larger size. If altering or substituting content such as digital images, typically one or more compilation properties may be employed to select images, such as by selecting images with similar or corresponding properties as the images being replaced. For example, a compilation in electronic form may have a particular resolution and/or format. The electronic compilation may include content. The content may be replaced with other content, and may be selected in one or more ways. The compilation properties along with one or more other properties may affect content selection, for example. Numerous iterations of content selection may be employed to provide a compilation having desired characteristics, such as a particular quality, for example. Additionally, if images are selected to replace other images, such as 'preview-only' or 'comp' images, and the final product does not meet particular quality standards, or one or more images were not properly identified, the process may have to be repeated, which may result in additional utilization of time and/or expense.

In one embodiment of the claimed subject matter, an electronic compilation may have one or more properties. Likewise, different portions of the electronic compilation may have differing properties. The electronic compilation may include electronic content, such as one or more pieces of digital media. Portions of the electronic content may be identified as being 'preview-only' or 'comp', for example, and may be replaced with other content if the compilation is being formed for final publication and/or commercial use. A subset of replacement electronic content may be selected based at least in part on one or more properties of the electronic compilation, such as one or more pieces of content being replaced, and/or one or more properties of the replacement electronic content in the subset. The set or subset of electronic content may comprise, for example, a plurality of pieces of electronic content that may have varying attributes, such as varying resolution, size and/or cost, and may comprise non-'preview-only' or 'comp' content. A subset of the set of electronic content may therefore be selected to be incorporated in the electronic compilation, and may be utilized to replace content. The subset may be selected based at least in part on the electronic compilation properties or properties of portions thereof, such as properties of 'preview-only' or 'comp' content, for example. The selected subset may be incorporated in the electronic compilation, such as by substituting at least a portion of the electronic compilation with the selected subset, for example. However, this embodiment may be better explained with reference to FIG. 2, below.

Figure 2:
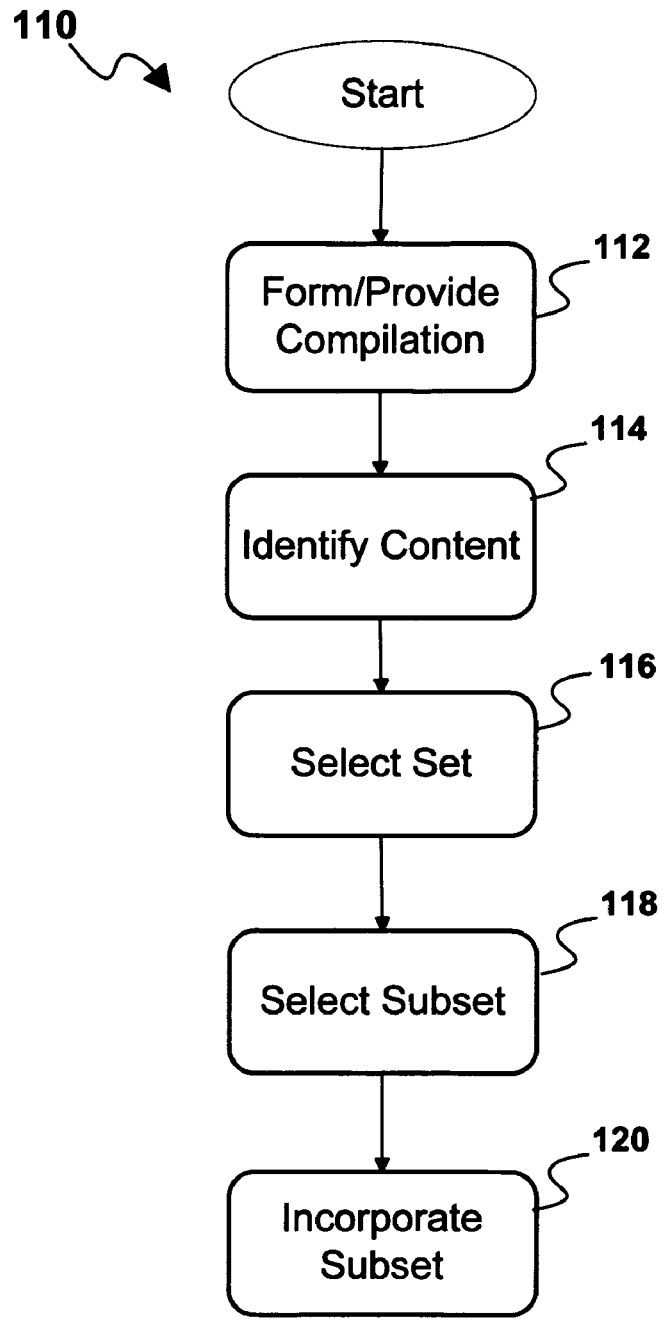
FIG. 2 is a flow diagram for a method of forming a compilation, in accordance with one or more embodiments.

Referring now to FIG. 2, one embodiment of a technique for forming a compilation is illustrated by flowchart 110. However, the order in which the blocks are presented does not necessarily limit claimed subject matter to any particular order. Additionally, intervening blocks not shown may be employed without departing from the scope of claimed subject matter. Flowchart 110 depicted in FIG. 2 may, in alternative embodiments, be implemented in a combination of hardware, software and/or firmware, such as part of a computer or computing system, and may comprise discrete and/or continual operations, although the claimed subject matter is not limited in scope in this respect. In this embodiment, at block 112, an electronic compilation may be formed or provided. The electronic compilation may comprise electronic content. The electronic content may comprise one or more 'candidate' pieces of content, such as one or more digital images, pieces of digital video, or pieces of digital audio, for example. At block 114, one or more pieces of content to be supplemented or replaced may be identified. This may comprise identifying 'preview-only' or 'comp' content, for example. At block 116, a set of electronic content to supplement or replace identified content may be selected. The set of electronic content may be selected based at least in part on one or more properties of the electronic compilation or portions thereof, such as one or more properties of identified electronic content presently included in the compilation. At block 118, a subset of the set may be selected to be incorporated or evaluated for incorporation in the electronic compilation. At block 120, the selected subset may be incorporated in the electronic compilation, such as by substituting at least a portion of the identified electronic compilation with the selected subset. It is noted that block 120 may be omitted in alternate embodiments, or accomplished through interaction, if desired.

In this embodiment, at block 112, an electronic compilation may be formed or provided. The electronic compilation may comprise a collection of electronic content, which may be assembled in any manner or in any format. For example, the compilation may comprise a web page, a print brochure, or one or more other types and categories of compilations, and in one embodiment may be embodied in print or electronic form, as an Adobe® Portable Document Format file or print document, as stated previously. The electronic content may include 'candidate' pieces of electronic content. The electronic content may comprise one or more types of digital media, such as digital images, audio and/or video, as explained previously. The electronic content may have particular properties, such as resolution, image size, frame size, configuration, quality, file type, cost, gray levels, print characteristics, compression, sampling rate, frame rate, clip length, percentage cropped, limitations on use, and/or classification, as just a few examples. The compilation may be provided in one or more manners, and the claimed subject matter is not so limited. However, if the compilation is embodied as a pdf file, the compilation may be provided as part of a 'preflight' function, as just an example.

At block 114, one or more pieces of content to be supplemented or replaced may be identified. As stated previously, this may comprise identifying 'preview-only' or 'comp' content included in the compilation, for example. Identifying particular content may comprise accessing portions of the content, such as electronic tags or embedded data, for example, although the claimed subject matter is not limited to any particular manner of identifying content. The identified content may comprise 'preview-only' or 'comp' content, and/or may comprise content that may be identified as desirable to replace, such as content having properties that may not be particularly suited for a final publication or commercial use, as just a few examples. Once identified, a notification may be provided, such as a notification that a piece of content is suitable for replacement, because the content is 'preview-only' or 'comp' content, for example.

At block 116, a set of electronic content may be selected. The set of electronic content may be selected from a grouping of content, such as may be available from a content provider, for example. The set of content may be selected from one or more sources, however, and the claimed subject matter is not limited in this respect. The set of electronic content may be selected based at least in part on one or more properties of the electronic compilation or a portion thereof. In one embodiment, the set of electronic content may be selected based on the subject matter of one or more portions of the electronic compilation. For example, an electronic compilation may include one or more digital images, and the digital images may be images of a particular subject. In one embodiment, the subject may be determined by accessing the digital image, or may be provided with the digital image such as by use of a file name or classification. A set of electronic content may comprise content of the same subject, such as digital images having the same subject, for example. Additionally, a set of content may be selected by identifying one or more non-'preview-only' or 'comp' versions of content included in the compilation, for example.

At block 118, a subset of the set of electronic content may then be selected. The subset of electronic content may be selected to be incorporated in the electronic compilation. The subset may be selected based at least in part on one or more properties of the electronic compilation, or one or more properties of the selected subset, or any portion of either. For example, a subset may be selected by determining one or more properties of the electronic compilation or a portion thereof. The subset may comprise one or more portions of the set which may correspond to one or more of the determined properties of the compilation or portions thereof, for example. In one embodiment, the set of electronic content may comprise a plurality of digital images. A subset of the plurality of the digital images may be selected for incorporation in to the electronic compilation. The subset may comprise a digital image having one or more properties corresponding to one or more properties of the electronic compilation, such as subject matter of the electronic compilation, for example. At block 120, the subset may be incorporated in the electronic compilation. The subset may be incorporated in the electronic compilation by substituting at least a portion of the electronic compilation with the selected subset. For example, if a digital image is selected from the set, the selected digital image may be incorporated in the electronic compilation by substituting the selected digital image for one or more digital images already incorporated in the electronic compilation, for example. The digital image that may be substituted by the selected image may have properties that may vary from the selected digital image, such as by having a lower resolution, or varying size, and may comprise a 'preview-only' or 'comp' image, in at least one embodiment. However, in alternative embodiments, the selected subset may not be used to substitute for a portion of the electronic compilation, but may be incorporated in the compilation without substitution, for example.

In one embodiment, if selecting a set of electronic content, a ranking scheme may be utilized to at least partially perform selecting. A ranking scheme may comprise a scheme whereby one or more properties of one or more portions of the set may be ranked against one or more properties of one or more other portions of the set. For example, a set may comprise a plurality of pieces of electronic content, such as a plurality of digital images. The digital images may have varying properties, as previously described. The varying properties of the digital images may be ranked, and the images may be accorded a particular rank. The particular rank may be utilized to at least partially select content. The ranking scheme may be determined based at least in part on one or more properties of the electronic compilation or portions thereof, or may be determined by a user. For example, a user may determine that particular properties of the content may be more desirable than other properties, and ranks may be assigned based at least in part on such desirable properties, for example. Additionally, the ranking scheme may include one or more 'trade-offs'. The 'trade-offs' may comprise a set of properties and the relative desirability of the properties of the set. For example, a user may desire to determine a piece of content from a set of content having a particular resolution at a particular cost, as just an example. The 'trade-offs' may be based, at least in part, on the form of media that the compilation is created for, such as web page or print advertisement form. Likewise, trade-offs may be calculated from user provided preferences. For example, if a compilation is created to be in print form, such as an advertisement, the subset may be selected so that the selected subset has a particular print quality. Conversely, if the compilation is created to be in electronic form, the subset may be selected so as to produce a particular resolution, for example.

Figure 3:
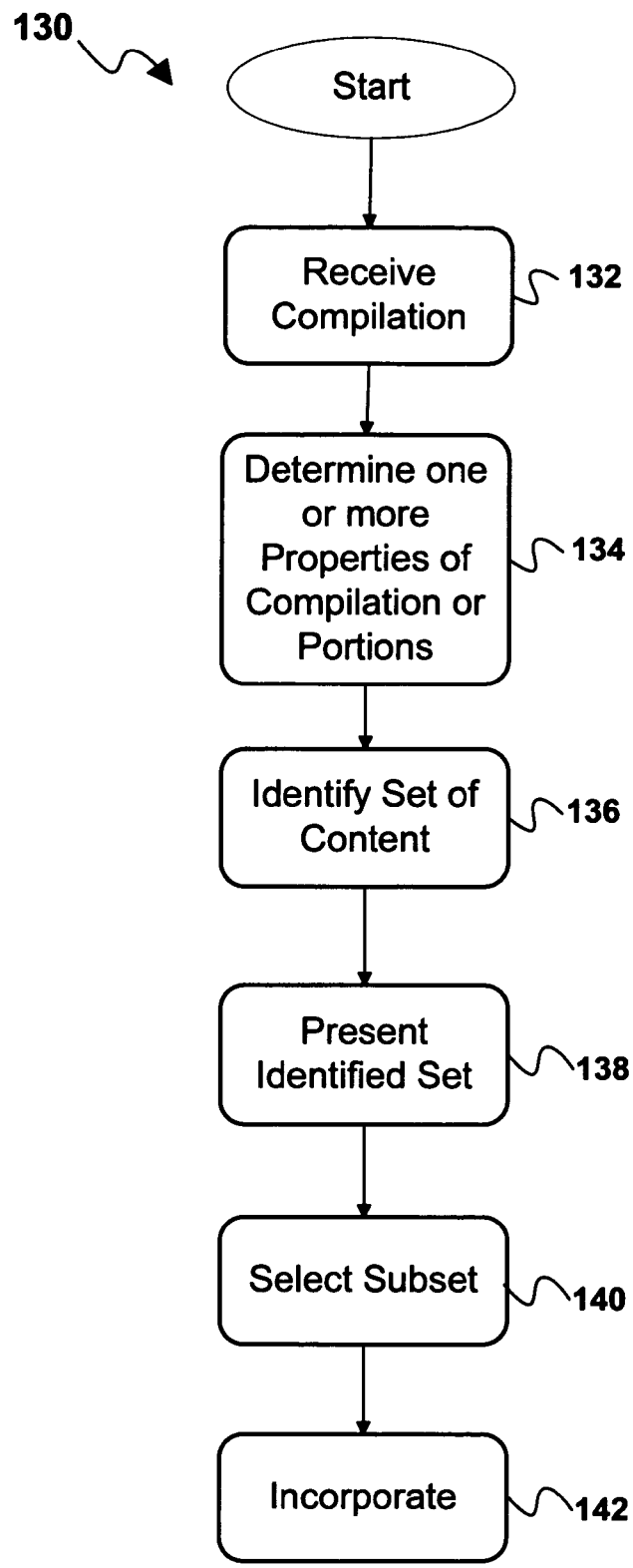
FIG. 3 is a flow diagram for a method of forming a compilation, in accordance with one or more embodiments.

Referring now to FIG. 3, one embodiment of a technique for forming a compilation is illustrated by a flowchart 130. However, again, the order in which the blocks are presented does not necessarily limit claimed subject matter to any particular order. Additionally, again, intervening blocks not shown may be employed without departing from the scope of claimed subject matter. At block 132, at least a portion of an electronic compilation may be received. The electronic compilation may be provided in whole or in part, and may include electronic content, such as one or more digital images. The electronic compilation may comprise, for example, a proposed design that may include one or more 'candidate' digital images that may comprise 'preview-only' or 'comp' images. At block 134, one or more properties of the electronic compilation or portions thereof may be determined. This may include identifying the content as being 'preview-only' or 'comp', for example. The identification may additionally include a notification, which may comprise a notification that content may be suitable for replacement based on one or more of the determined properties, for example. The one or more properties may be determined by accessing at least a portion of the electronic compilation.

At block 136, a set of electronic content may be identified from a group of content, such as may be available from a content provider. The set of electronic content may comprise content having corresponding properties with a portion of the electronic compilation, for example, or may be identified based on one or more other criteria, such as by identifying non-'preview-only' or 'comp' versions of content. At block 138, the identified set of electronic content may be presented. The set of electronic content may be presented by displaying the identified set of content in electronic form on a display device of a computing system, for example. Additionally, the identified set may be presented by displaying one or more properties of the set, or by presenting a version of the set, such as a 'thumbnail' of one or more portions of the set. However, other methods to present the set may be employed in other embodiments.

At block 140, a subset may be selected. The subset may be selected manually, or may be selected by ranking based on a ranking scheme, as previously described. The ranking scheme may be applied, and the subset may be selected. Additionally, one or more 'trade-offs' may be made manually or may be calculated, such the relative desirability of the properties of the set. The subset may then be selected based at least in part on the 'trade-offs', for example. At block 142, at least a portion of the selected subset may be at least partially incorporated in the electronic compilation, such as by substituting at least a portion of the electronic compilation with at least a portion of the selected subset, or by incorporating at least a portion of the selected subset in the compilation without substation, for example. In one embodiment, if the electronic compilation comprises a proposed design, and comprises one or more 'candidate' pieces of electronic content, the one or more 'candidate' pieces of electronic content may be substituted with one or more pieces of electronic content having varying properties, such a higher resolution, for example.

It is now appreciated, based at least in part on the foregoing disclosure, that a combination of hardware, software and/or firmware may be produced capable of performing one or more of the functions as described herein. It will additionally be understood that, although particular embodiments have just been described, claimed subject matter is not limited in scope to a particular embodiment or implementation. For example, a system capable of implementing one or more of the foregoing operations may comprise hardware, such as implemented to operate on a device or combination of devices, for example, whereas another embodiment may be in software and hardware, for example. Likewise, an embodiment of a system capable of implementing one or more of the abovementioned operations may be implemented in firmware, or as any combination of hardware, software and/or firmware, for example. Additionally, all or a portion of one embodiment may be implemented to operate at least partially in or on one device, such as a display, a computing device, a set top box, a cell phone, and/or a personal digital assistant (PDA), for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, a set top box, a cell phone, a personal digital assistant (PDA) and/or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more types of memory, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for generating compilations, comprising:

creating a compilation including one or more portions of content of digital images that are identified as being preview-only or comp content without manually searching or identifying said content;

selecting, by processing electronic signals by a specialized apparatus, one or more properties of a set of digital images based, at least in part, on a ranking of user desirability of the one or more properties of the set of digital images, wherein said ranking includes one or more trade-offs, and wherein said ranking is based, at least in part, on cost, and quality;

determining a trade-off among said one or more trade-offs between a first particular property and a second particular property among said one or more properties;

selecting a subset of said set of said digital images for use in at least a portion of the electronic compilation, wherein the trade-off is based, at least in part, on a form of media for which said electronic compilation is created, for a web page or advertisement form, and wherein the subset being further selected based, at least in part, on said trade-off, the properties of the selected subset of digital images, and the ranking; and repeatedly substituting at least a portion of the selected subset of digital images with at least a portion of the electronic compilation if one or more of digital images are not properly identified in an additional utilization of time;

selecting said set of said digital images based, at least in oart, on properties of said compilation or portions thereof, wherein said set comprises a plurality of portions of said digital images having varying properties comprising resolution, image size, frame size, configuration, quality, file type, cost, gray levels, compression, sampling rate, frame rate, clip length, percentage cropped, limitations on use and classification.

2. The method of claim 1, and further comprising processing electronic signals by said specialized apparatus to substitute at least a portion of the selected subset of said digital images for at least a portion of the electronic compilation.

3. The method of claim 1, and further comprising processing electronic signals by said specialized apparatus to select the set of said digital images based at least in part on properties of said compilation or portions thereof.

4. The method of claim 1, wherein said ranking is based, at least in part, on cost, quality, and availability.

5. The article of claim 1, wherein the one or more properties comprise at least one of resolution, image size, frame size, configuration, quality, file type, cost, gray levels, print characteristics, compression, sampling rate, frame rate, clip length, percentage cropped, limitations on use and classification.

6. The method of claim 1, wherein said subset is at least partially selected by a user.

7. The method of claim 1, wherein the subset comprises a plurality of pieces of said digital images having varying properties.

8. The method of claim 7, wherein said varying properties comprise at least one of resolution, image size, frame size, configuration, quality, file type, cost, gray levels, print characteristics, compression, sampling rate, frame rate, clip length, percentage cropped, limitations on use, and classification.

9. The method of claim 1, and further comprising:

processing electronic signals by said specialized apparatus to preview the electronic compilation with the at least a portion of the subset incorporated, and providing the capability to approve the electronic compilation.

10. The method of claim 1, wherein a user performs said ranking of said one or more properties based, at least in part, on a relative desirability of said one or more properties.

11. An article comprising: a storage medium having stored thereon instructions executable by a special purpose processor to:

create a compilation including one or more portions of content of digital images that are identified as being preview-only or comp content without manually searching or identifying said content;

select, by processing electronic signals by a specialized apparatus, one or more properties of a set of digital images based, at least in part, on a ranking of user desirability of said one or more properties of the set of digital images, wherein said ranking includes one or more trade-offs, and wherein said ranking is based, at least in part, on cost, and quality;

determine a trade-off among said one or more trade-offs between a first particular property and a second particular property among said one or more properties;

select a subset of said set of said digital images for use in at least a portion of an electronic compilation, wherein said trade-off is based, at least in part, on a form of media for which said electronic compilation is created, and wherein said subset being selected based, at least in part, on said trade-off, said properties of said selected subset of said digital images, and said ranking; and repeatedly substitute at least a portion of said selected subset of said digital images with at least a portion of said electronic compilation if one or more of said digital images are not properly identified in an additional utilization of time;

select said set of said digital images based, at least in part, on properties of said compilation or portions thereof, wherein said set comprises a plurality of portions of said digital images having varying properties comprising resolution, image size, frame size, configuration, quality, file type, cost, gray levels, compression, sampling rate, frame rate, clip length, percentage cropped, limitations on use and classification.

12. The article of claim 11,
wherein said stored instructions are executable by said special purpose processor to:
substitute at least a portion of the selected subset of digital images for at least a portion of the electronic compilation.

13. The article of claim 11,
wherein said stored instructions are executable by said special purpose processor to:
select the set of digital images based at least in part on properties of said compilation.

14. The article of claim 11, wherein said ranking is based, at least in part, on cost, quality, and availability.

15. The article of claim 11, wherein the one or more properties comprises at least one of resolution, image size, frame size, configuration, quality, file type, cost, gray levels, print characteristics, compression, sampling rate, frame rate, clip length, percentage cropped, limitations on use, and classification.

16. The article of claim 11, wherein said set comprises a plurality of pieces of digital images having varying properties comprising resolution, image size, frame size, configuration, quality, file type, cost, gray levels, print characteristics, compression, sampling rate, frame rate, clip length, percentage cropped, limitations on use, and classification.

17. The article of claim 11,
wherein said stored instructions are executable by said special purpose processor to:
preview the electronic compilation with the at least a portion of the subset incorporated, and providing a user with capability to approve the electronic compilation.

18. An apparatus for generating compilations, the apparatus comprising:
a memory comprising machine readable instructions:
one or more processors coupled to the memory, wherein said machine readable instructions are executable by said one or more processors for:
creating a compilation including one or more portions of content of digital images that are identified as being preview-only or comp content without manually searching or identifying said content;

selecting, by processing electronic signals by a specialized apparatus, one or more properties of a set of digital images based, at least in part, on a ranking of user desirability of said one or more properties of the set of digital images, wherein said ranking includes one or more trade-offs, and wherein said ranking is based, at least in part, on cost, and quality;

determining a trade-off among said one or more trade-offs between a first particular property and a second particular property among said one or more properties;

selecting a subset of said set of said digital images for use in at least a portion of an electronic compilation, wherein said trade-off is based, at least in part, on a form of media for which said electronic compilation is created, and wherein said subset being selected based, at least in part, on said trade-off, said properties of said selected subset of said digital images, and said ranking; and repeatedly substituting at least a portion of said selected subset of said digital images with at least a portion of said electronic compilation if one or more of said digital images are not properly identified in an additional utilization of time;

selecting said set of said digital images based, at least in part, on properties of said compilation or portions thereof, wherein said set comprises a plurality of portions of said digital images having varying properties comprising resolution, image size, frame size, configuration, quality, file type, cost, gray levels, compression, sampling rate, frame rate, clip length, percentage cropped, limitations on use and classification.

19. The apparatus of claim 18,
wherein said machine readable instructions are executable by said one or more processors for substituting at least a portion of the selected subset of digital images for at least a portion of the electronic compilation.

20. The apparatus of claim 18, wherein said ranking is based, at least in part, on cost, quality, and availability.

21. The apparatus of claim 18, wherein one or more properties comprise at least one of resolution, image size, frame size, configuration, quality, file type, cost, gray levels, print characteristics, compression, sampling rate, frame rate, clip length, percentage cropped, limitations on use, and classification.

22. The apparatus of claim 18, and wherein said machine readable instructions are executable by said one or more processors for previewing the electronic compilation with the at least a portion of the subset incorporated, and providing a user with capability to approve the electronic compilation.

* * * * *